Figure 1:
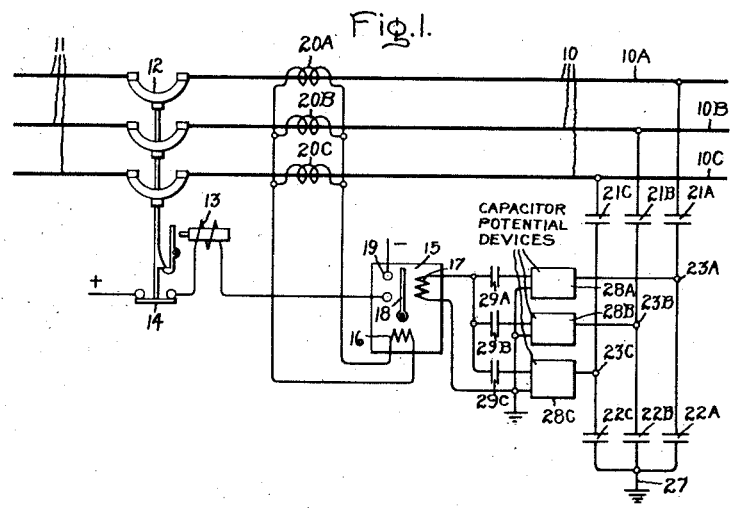

Aug. 29, 1944.   H. T. SEELEY   2,357,138
PROTECTIVE SYSTEM
Filed June 30, 1942

Inventor:
Harold T. Seeley,
by Harry C. Dunham
His Attorney.

Patented Aug. 29, 1944

2,357,138

UNITED STATES PATENT OFFICE 2,357,138

PROTECTIVE SYSTEM

Harold T. Seeley, Lansdowne, Pa., assignor to General Electric Company, a corporation of New York Application June 30, 1942, Serial No. 449,047

3 Claims. (Cl. 175—294)

My invention relates to a protective system and more particularly to a ground-fault protective system for a polyphase alternating-current circuit having no available ground connection at the relaying point.

A common way of obtaining for relaying purposes a zero-sequence quantity from a polyphase circuit in which a ground connection is not readily available is to utilize a transformer having a star or Y-connected primary winding connected to the polyphase circuit and a broken delta secondary winding from which the zero-sequence quantity is obtainable. However, such a transformer is relatively expensive and, when the connection with the polyphase circuit is made through a capacitive coupling means, such as bushing potential devices, whereby a considerable reduction in cost is obtainable as contrasted with considerably more expensive potential transformers, such a Y broken delta type of transformer imposes too great a burden on the bushing potential devices.

It has been suggested that a zero-sequence quantity for ground-fault protective systems may be obtained from a polyphase circuit in which no ground connection is readily available at the relaying point by establishing a floating or artificial neutral with a network of star or Y-connected impedances. In a copending application of A. R. van C. Warrington, Serial No. 374,740, filed January 16, 1941, and assigned to the same assignee as the present application, such a network of Y-connected impedances for establishing a floating neutral is disclosed. For sensitive ground-fault protection, a wattmetric or product type relay or electro-responsive device is quite often used and, in order to produce a torque, it is necessary that the zero-sequency quantity which may be used to energize both windings has a different phase relationship in one winding with respect to the phase of this quantity in the other winding and, consequently, a suitable phase-shifting device, which may take the form of a capacitor, is usually required.

It would be desirable to provide a ground-fault protective system for a polyphase alternating-current circuit having no available ground connection at the relaying point in which the impedance elements for establishing the floating neutral also provide the desired phase shift, whereby the phase-shifting device customarily required heretofore may be dispensed with.

Accordingly, it is an object of my invention to provide a new and improved ground-fault protective system for a polyphase alternating-current circuit having no available ground connection at the relaying point.

It is another object of my invention to provide a new and improved ground-fault protective system which is less expensive than arrangements used heretofore in that certain elements which were necessary heretofore can now be dispensed with and which will perform as satisfactorily as the prior-art arrangements.

Further objects and advantages of my invention will become apparent as the following description proceeds and the features of novelty which characterize my invention will be pointed out with particularity in the claims annexed to and forming a part of this specification.

Figure 2:
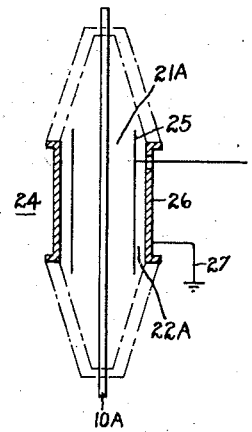

For a better understanding of my invention, reference may be had to the accompanying drawing in which Fig. 1 is a diagrammatic representation of a protective system embodying my invention, and Fig. 2 illustrates a capacitive coupling which may be used with the protective system of Fig. 1 and which is schematically illustrated in Fig. 1.

Although my invention is applicable to any electric circuit, device, or winding of the polyphase type having no neutral connection available at the relaying point, I have chosen to illustrate my invention as associated with a three-phase electric circuit 10 comprising phase conductors 10A, 10B, and 10C, respectively. Electric circuit 10 is preferably connected to an associated electric system 11 through a suitable circuit-interrupting device 12 which has been illustrated as a latched-closed type of circuit breaker having a trip coil 13 and an "a" switch 14 which is closed when the circuit breaker is closed and open when the circuit breaker is open. Polyphase alternating-current system 11 should be grounded but no ground connection is available at the point on circuit 10 at which the relaying quantities for operating the ground-fault protective system are desired.

In order to isolate the polyphase alternating-current circuit 10 from system 11 in the event of a ground fault on circuit 10, I provide a sensitive ground-fault relay or electroresponsive device 15 which is of the product or wattmetric type having a plurality of windings 16 and 17. Electroresponsive device 15 includes a movable element including switching member 18 for controlling contacts 19 connected in series with trip coil 13 and "a" switch 14. Winding 16 may be energized with a zero-sequence quantity existing on polyphase circuit 10, for example, through a plurality of current transformers 20, specifically designated as 20A, 20B, and 20C associated with the respective phase conductors of polyphase circuit 10 having the same subscript. The sum of the outputs of the secondary windings of these current transformers is the residual current flowing in circuit 10 and is, consequently, a zero-sequence quantity.

In order to obtain another zero-sequence quantity from polyphase circuit 10, I provide a capacitive coupling device schematically illustrated in Fig. 1 as comprising a capacitor 21 and 22 for each phase conductor of polyphase circuit 10. These capacitors are designated by the appropriate subscripts, A, B, or C, depending on the particular phase conductor with which they are associated. As indicated in Fig. 1, the capacitors for each phase conductor, such as 21A and 22A, are connected in series with one another between the phase conductor 10A and ground to form a potential divider so that the relaying potential may be obtained from the point 23A intermediate the capacitors 21A and 22A. This capacitor coupler arrangement is schematically illustrated in Fig. 1 but actually is mounted in the bushing of circuit breaker 12, for example, as indicated in Fig. 2, where 10A represents the A phase conductor extending through the bushing of circuit breaker 12 which is generally indicated at 24. A tubular conductor member 25 coaxial with respect to the phase conductor 10A provides one plate of the capacitor 21A while conductor 10A provides the other plate. Similarly, an outer tubular conducting member 26 spaced from and coaxially arranged with member 25 provides the capacitor 22A between members 25 and 26, the latter of which is grounded at 27 as indicated in Figs. 1 and 2. Such a capacitor coupling, when mounted within the bushing of the circuit breaker or other electrical device, is relatively inexpensive and takes up a very small amount of space as will be understood by those skilled in the art. Suitable transformer means connected between ground and the terminals 23A, 23B, and 23C of the capacitor coupling device are provided as will be understood by those skilled in the art which are generally designated as 28A, 28B, and 28C in Fig. 1.

In order to establish a floating neutral for circuit 10 in the absence of an available ground at the relaying point, I provide a network of impedances illustrated as capacitors 29A, 29B, 29C, respectively, connected to the ungrounded terminals of the capacitor potential devices. These capacitors 29 are connected in Y and the winding 17 of electroresponsive device or relay 15 is connected between the neutral of the Y-connected network of capacitors and ground so that a zero-sequence current flows through winding 17.

In prior-art arrangements where a Y-connected network of reactances or resistances was used to establish a floating neutral, it was necessary to connect a suitable phase-shifting device in the circuit of relay winding 17 in order to obtain a predetermined phase displacement between the currents flowing in windings 16 and 17. If the currents flowing in windings 16 and 17 are in phase, no torque will be produced on switching member 18. With the arrangement described thus far, however, it is unnecessary to provide a phase shifting device such as a capacitor, for example, in series with winding 17 to give the desired phase displacement, since, by using a network of capacitors, such as 29A, 29B, and 29C, not only is a floating neutral established but, by properly choosing the value of capacitance, the inductance of winding 17 is neutralized either completely or to any desired extent. In order to give the desired phase shift, the capacitance of capacitors 29 should be one third the value of the capacitance which might otherwise be used in series with winding 17 to neutralize all or a predetermined portion of the reactance thereof, thereby obtaining the same phase of the current flowing in winding 17 with respect to a reference quantity. Of course, if the current in winding 17 had been obtained from a broken delta winding as mentioned above, three times the potential would have been obtained and, consequently, to obtain the same torque level, it might be desirable to provide winding 17 with one third the number of turns required when a broken delta winding on an auxiliary potential transformer is utilized and, consequently, the capacitance of capacitors 29 would have to be three times the size or, in other words, have three times the value of capacitance that would be required if a single capacitance in series with winding 17 were provided. Since these capacitors are relatively small, their cost does not increase in direct proportion to their rating.

The operation of the protective system illustrated above will be obvious to those skilled in the art and no further discussion will be included herewith.

By using a network of capacitors and proportioning the value of capacitance as set forth above, not only does the network provide a floating neutral for obtaining a zero-sequence quantity from an associated circuit but also replaces a phase-shifting element which was required heretofore. In addition to saving the cost of such an element, the use of the capacitor network permits the use of capacitances of reasonable size instead of having to make their impedances low enough to be negligible as would be the case if the former phase-shifting impedance element were retained along with the network for establishing the floating neutral. Instead of serving as a phase-shifting impedance in addition to providing a floating neutral, said network of capacitors might be used merely to neutralize the inductance of a winding such as 17 to decrease the burden which electroresponsive device 18 puts on the capacitor coupling devices of the type illustrated in Fig. 2.

While I have shown and described my invention as applied to a particular system of connections, and as embodying various devices diagrammatically shown, it will be obvious to those skilled in the art that changes and modifications may be made without departing from my invention and I, therefore, aim in the appended claims to cover all such changes and modifications as fall within the spirit and scope of my invention.

What I claim as new and desire to secure by Letters Patent of the United States is:

1. In a ground-fault protective system for a polyphase alternating current circuit having no available ground connection at the relaying point, an electroresponsive device of the wattmetric type having two windings, means for energizing one of said windings in response to a zero phase sequence quantity of said circuit, means including a star-connected network of capacitors associated with said circuit for establishing a floating neutral for said polyphase circuit, and means for connecting the other of said windings to the neutral of said star-connected network, said network of capacitors being constructed to neutralize a predetermined portion of the inductive reactance of said other winding so that the current flowing through said other winding has a predetermined phase relationship with respect to the current in said one winding so as to produce a high torque on said electroresponsive device in the event of a ground fault on said circuit.

2. In a zero-sequence responsive device for a polyphase alternating-current circuit having no available ground connection at the relaying point, an electroresponsive device of the wattmetric type having two windings, means for energizing one of said windings in response to a zero phase sequence quantity of said circuit, means including a star-connected network of capacitors connected to said circuit for establishing a floating neutral for said polyphase circuit, and means for connecting the other of said windings to the neutral of said star-connected network, said network being so constructed and arranged to neutralize a predetermined portion but less than all of the inductive reactance of said other winding so that the current flowing through said other winding has a predetermined phase relationship with respect to the current in said one winding so as to produce a high torque on said electroresponsive device in the event of a ground fault on said circuit.

3. In a ground-fault protective system for a polyphase alternating-current circuit having no available ground connection, an electroresponsive device of the wattmetric type having a pair of windings, means for energizing one of said windings in response to a zero-phase-sequence quantity of said circuit, means including a network for establishing a floating neutral for said circuit comprising a plurality of star-connected impedances connected to said circuit, and means for energizing the other of said windings with a second zero-sequence quantity obtained from said network, said network of impedances serving to provide a predetermined phase displacement greater than zero degrees between the currents flowing in said pair of windings to produce a high torque on said electroresponsive device in the event of a ground fault on said circuit.

HAROLD T. SEELEY.